(12) United States Patent
Mukherjee et al.

(10) Patent No.: US 6,792,525 B2
(45) Date of Patent: Sep. 14, 2004

(54) INPUT REPLICATOR FOR INTERRUPTS IN A SIMULTANEOUS AND REDUNDANTLY THREADED PROCESSOR

(75) Inventors: Shubhendu S. Mukherjee, Framingham, MA (US); Steven K. Reinhardt, Ann Arbor, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 603 days.

(21) Appl. No.: 09/838,069

(22) Filed: Apr. 19, 2001

(65) Prior Publication Data

US 2001/0037448 A1 Nov. 1, 2001

Related U.S. Application Data

(60) Provisional application No. 60/198,530, filed on Apr. 19, 2000.

(51) Int. Cl.[7] .................................................. G06F 9/38

(52) U.S. Cl. ....................................... 712/244; 712/235

(58) Field of Search ................................. 712/244, 246, 712/214, 215, 235, 21, 22

(56) References Cited

U.S. PATENT DOCUMENTS

| | | | |
|---|---|---|---|
| 5,758,142 A | 5/1998 | McFarling et al. | 395/586 |
| 5,933,860 A | 8/1999 | Emer et al. | 711/213 |
| 6,317,820 B1 * | 11/2001 | Shiell et al. | 712/32 |
| 6,357,016 B1 * | 3/2002 | Rodgers et al. | 713/601 |
| 6,496,925 B1 * | 12/2002 | Rodgers et al. | 712/244 |

OTHER PUBLICATIONS

*AR-SMT: Microarchitectural Approach To Fault Tolerance In Microprocessors*, Eric Rotenberg, (8 p.).
*DIVA: A Dynamic Approach To Microprocessor Verification*, Todd M. Austin, Journal of Instruction-Level Parallelism 2 (2000) 1–6, Submitted Feb. 2000; published May 2000 (26 p.).
*DIVA: A Reliable Substrate For Deep Submicron Microarchitecture Design*, Todd M. Austin, May/Jun. 1999 (12 p.).
M. Franklin, "Incorporating Fault Tolerance in Superscalar Processors," Proceedings of High Performance Computing, Dec., 1996.
A. Mahmood et al., "Concurrent Error Detection Using Watchdog Processors—A Survey," IEEE Trans. on Computers, 37(2):160–174, Feb. 1988.
J. H. Patel et al., "Concurrent Error Detection In ALU's by Recomputing With Shifted Operands," IEEE Trans. on Computers, 31(7):589–595, Jul. 1982.

(List continued on next page.)

*Primary Examiner*—Henry W. H. Tsai

(57) ABSTRACT

A processor is disclosed having a fetch unit that initiating interrupt service routines in redundant, unsynchronized threads. A counter is provided to track the difference between leading and trailing threads in terms of the number of instructions committed by the instruction execution circuitry. When the processor receives an external interrupt signal, the instruction fetch unit stalls the leading thread until the counter indicates that the threads are synchronized, and then simultaneously initiates an interrupt service routine in each of the threads. In a second embodiment similar to the first, the instruction fetch unit does not stall the leading thread, but rather, immediately initiates the interrupt service routine in the leading thread, and copies the difference to an interrupt counter. When the counter reaches zero, the fetch unit initiates the interrupt service routine in the trailing thread.

29 Claims, 2 Drawing Sheets

OTHER PUBLICATIONS

D. A. Reynolds et al., "Fault Detection Capabilities Of Alternating Logic," IEEE Trans. on Computers, 27(12):1093–1098, Dec. 1978.

E. Rotenberg et al., "Trace Cache: A Low Latency Approach To High Bandwidth Instruction Fetching," Proceedings of the 29th Annual International Symposium on Microarchitecture, pp. 24–34, Dec. 1996.

E. Rotenberg et al., "Trace Processors," 30th Annual International Symposium on Microarchitecture (MICRO–30), Dec. 1997.

T. J. Slegel et al., "IBM's S/390 G5 Microprocessor Design," IEEE Micro, pp. 12–23, Mar./Apr. 1999.

J. E. Smith et al., "Implementing Precise Interrupts In Pipelined Processors," IEEE Trans. on Computers, 37(5):562–573, May 1988.

G. S. Sohi et al., "A Study Of Time–Redundant Fault Tolerance Techniques For High–Performance Pipelined Computers," Digest of Papers, 19th International Symposium on Fault–Tolerant Computing, pp. 436–443, 1989.

G. S. Shoi et al., "Instruction Issue Logic For High–Performance, Interruptible, Multiple Functional Unit, Pipelined Computers," IEEE Transactions on Computers, 39(3):349–359, Mar. 1990.

D. M. Tullsen, et al., "Simultaneous Multithreading: Maximizing On–Chip Parallelism," Proceedings of the 22nd Annual International Symposium on Computer Architecture, Italy, Jun. 1995.

D. Tullsen et al., "Exploiting Choice: Instruction Fetch And Issue On An Implementable Simultaneous Multithreading Processor," Proceedings of the 23rd Annual International Symposium on Computer Architecture (ISCA), May 1996.

S. K. Reinhardt et al., "Transient Fault Detection Via Simultaneous Multithreading" (12 p.).

L. Spainhower et al., "IBM S/390 Parallel Enterprise Server G5 Fault Tolerance: A Historical Perspective," IBM J. Res. Develop. vol. 43, No. 5/6, Sep./Nov. 1999, pp. 863–873.

M. Franklin, "A Study Of Time Redundant Fault Tolerance Techniques For Superscalar Processors" (5 p.).

K. Sundaramoorthy et al. "Slipstream Processors: Improving Both Performance And Fault Tolerance" (6 p.).

* cited by examiner

INPUT REPLICATOR FOR INTERRUPTS IN A SIMULTANEOUS AND REDUNDANTLY THREADED PROCESSOR

CROSS-REFERENCE TO RELATED APPLICATIONS

This application is a non-provisional application claiming priority to provisional application Serial No. 60/198,530, filed on Apr. 19, 2000, entitled "Transient Fault Detection Via Simultaneous Multithreading," the teachings of which are incorporated by reference herein.

This application is further related to the following co-pending applications, each of which is hereby incorporated herein by reference:

U.S. patent application Ser. No. 09/584,034, filed May 30, 2000, and entitled "Slack Fetch to Improve Performance of a Simultaneous and Redundantly Threaded Processor."

U.S. patent application Ser. No. 09/837,995, filed Apr. 19, 2001, and entitled "Simultaneously and Redundantly Threaded Processor Store Instruction Comparator."

U.S. patent application Ser. No. 09/839,459, filed Apr. 19, 2001, and entitled "Cycle Count Replication in a Simultaneous and Redundantly Threaded Processor."

U.S. patent application Ser. No. 09/839,621, filed Apr. 19, 2001, and entitled "Active Load Address Buffer."

U.S. patent application Ser. No. 09/838,078, filed Apr. 19, 2001, and entitled "Simultaneous and Redundantly Threaded Processor Branch Outcome Queue."

U.S. patent application Ser. No. 09/839,626, filed Apr. 19, 2001, and entitled "Simultaneously and Redundantly Threaded Processor Uncached Load Address Comparator and Data Value Replication Circuit."

U.S. patent application Ser. No. 09/839,624, filed Apr. 19, 2001, and entitled "Load Value Queue Input Replication in a Simultaneous and Redundantly Threaded Processor."

BACKGROUND OF THE INVENTION

1. Field of the Invention

The present invention generally relates to microprocessors. More particularly, the present invention relates to a pipelined, multithreaded processor that can execute a program in at least two separate, redundant threads. More particularly still, the invention relates to a method and apparatus for ensuring valid replication of external interrupts.

2. Background of the Invention

Solid state electronics, such as microprocessors, are susceptible to transient hardware faults. For example, cosmic rays can alter the voltage levels that represent data values in microprocessors, which typically include tens or hundreds of thousands of transistors. Cosmic radiation can change the state of individual transistors causing faulty operation. Faults caused by cosmic radiation typically are temporary and the transistors eventually switch back to their normal state. The frequency of such transient faults is relatively low—typically less than one fault per year per thousand computers. Because of this relatively low failure rate, making computers fault tolerant currently is attractive more for mission-critical applications, such as online transaction processing and the space program, than computers used by average consumers. However, future microprocessors will be more prone to transient faults due to their smaller anticipated size, reduced voltage levels, higher transistor count, and reduced noise margins. Accordingly, even low-end personal computers may benefit from being able to protect against such faults.

One way to protect solid state electronics from faults resulting from cosmic radiation is to surround the potentially effected electronics by a sufficient amount of concrete. It has been calculated that the energy flux of the cosmic rays can be reduced to acceptable levels with six feet or more of concrete surrounding the computer containing the chips to be protected. For obvious reasons, protecting electronics from faults caused by cosmic ray with six feet of concrete usually is not feasible. Further, computers usually are placed in buildings that have already been constructed without this amount of concrete. Other techniques for protecting microprocessors from faults created by cosmic radiation also have been suggested or implemented.

Rather than attempting to create an impenetrable barrier through which cosmic rays cannot pierce, it is generally more economically feasible and otherwise more desirable to provide the affected electronics with a way to detect and recover from a fault caused by cosmic radiation. In this manner, a cosmic ray may still impact the device and cause a fault, but the device or system in which the device resides can detect and recover from the fault. This disclosure focuses on enabling microprocessors (referred to throughout this disclosure simply as "processors") to recover from a fault condition. One technique, such as that implemented in the Compaq Himalaya system, includes two identical "lock-stepped" microprocessors. Lockstepped processors have their clock cycles synchronized and both processors are provided with identical inputs (i.e., the same instructions to execute, the same data, etc.). A checker circuit compares the processors' data output (which may also include memory addressed for store instructions). The output data from the two processors should be identical because the processors are processing the same data using the same instructions, unless of course a fault exists. If an output data mismatch occurs, the checker circuit flags an error and initiates a software or hardware recovery sequence. Thus, if one processor has been affected by a transient fault, its output likely will differ from that of the other synchronized processor. Although lockstepped processors are generally satisfactory for creating a fault tolerant environment, implementing fault tolerance with two processors takes up valuable real estate.

A pipelined, simultaneous multithreaded, out-of-order processor generally can be lockstepped. A "pipelined" processor includes a series of functional units (e.g., fetch unit, decode unit, execution units, etc.), arranged so that several units can be simultaneously processing an appropriate part of several instructions. Thus, while one instruction is being decoded, an earlier fetched instruction can be executed. A "simultaneous multithreaded" ("SMT") processor permits instructions from two or more different program threads (e.g., applications) to be processed through the processor simultaneously. An "out-of-order" processor permits instructions to be processed in an order that is different than the order in which the instructions are provided in the program (referred to as "program order"). Out-of-order processing potentially increases the throughput efficiency of the processor. Accordingly, an SMT processor can process two programs simultaneously.

An SMT processor can be modified so that the same program is simultaneously executed in two separate threads to provide fault tolerance within a single processor. Such a processor is called a simultaneously and redundantly threaded ("SRT") processor. Some of the modifications to turn a SMT processor into an SRT processor are described in Provisional Application Serial No. 60/198,530.

Executing the same program in two different threads permits the processor to detect faults such as may be caused by cosmic radiation, noted above. By comparing the output data from the two threads at appropriate times and locations within the SRT processor, it is possible to detect whether a fault has occurred. For example, data written to cache memory or registers that should be identical from corresponding instructions in the two threads can be compared. If the output data matches, there is no fault. Alternatively, if there is a mismatch in the output data, a fault has occurred in one or both of the threads.

Although an SRT processor can provide lockstepped execution of redundant threads, forcing the programs to remain lockstepped imposes significant performance penalties. The performance suffers because the two threads are always competing for the same resources, so that no intelligent resource sharing is allowed. The two threads will also suffer the same latency caused by cache misses, and will suffer the same penalty for branch misspeculations. As explained in U.S. patent application Ser. No. 09/584,034, the performance of an SRT processor can be significantly enhanced by eliminating the lockstep requirement and introducing some slack between the execution of the threads. Each of the threads then gains a statistically improved access to processor resources, and is able to benefit in the normal way from out-of-order instruction execution. In addition, the trailing thread is allowed to avoid suffering any cache miss latency if the slack is chosen properly. Further, the branch information from the leading thread is provided to the trailing thread, so that the trailing thread is able to avoid any branch misspeculation. Whenever the slack between the two threads falls below some threshold, the instruction fetch circuitry preferentially fetches more instructions for the leading thread. The net result is faster execution for both threads, and an overall average performance improvement of about 16% has been achieved.

FIG. 1 shows a conceptual model which can be applied to a fault-tolerant system. The system is divided into a sphere of replication 10 and the rest of the system 12. The sphere of replication 10 represents the portion of the system that provides fault protection by duplication. This would include, for example, lockstepped processors (duplicate hardware) or SRT processors (duplication of execution). In FIG. 1, the duplication is shown by redundant execution copies 18, 19. The portion 12 of the system outside the sphere of replication 10 is protected by means other than duplication. Portion 12 generally includes system memory and disk storage, and often includes cache memories. These elements are commonly protected against faults by parity checks or other error correction coding techniques.

The two portions of the system are conceptually coupled by an input replicator 14, and an output comparator 16. The input replicator 14 provides both of the redundant execution copies 18, 19 with identical values, and the output comparator 16 verifies that the output values match before it allows information to be sent to the rest of the system 12. This prevents any faults inside the sphere of replication 10 from propagating to the rest of the system, and it provides an opportunity for fault detection. Upon detecting a fault, the comparator 16 preferably initiates some kind of fault recovery procedure.

In a synchronous, lockstep system, input replicator 14 and output comparator 16 are so straightforward as to be almost overlooked. At any given clock cycle, the same input is provided to both execution copies 18, 19, and the outputs from both copies 18, 19 are compared for verification. However, the system of U.S. patent application Ser. No. 09/584,034 presents several issues that the replicator and comparator implementations must address. These include a variable slack between inputs and outputs for the execution copies, variable orders of inputs and outputs for the execution copies, and branch misspeculation by only the leading thread. Accordingly, it would be desirable to provide an input replicator implementation that addresses these issues in an efficient manner.

BRIEF SUMMARY OF THE INVENTION

The problems noted above are in part solved by a processor having an instruction fetch unit that accounts for slack between threads when initiating interrupt service routines in the threads. In one embodiment, the processor comprises: instruction execution circuitry, a counter, and an instruction fetch unit. The instruction execution circuitry executes instructions in a leading thread and a redundant, trailing thread. The counter tracks the difference between the leading and trailing thread in terms of the number of instructions committed by the instruction execution circuitry. The instruction fetch unit fetches instructions for the redundant threads. When the processor receives an external interrupt signal, the instruction fetch unit stalls the leading thread until the counter indicates that the threads are synchronized, and then simultaneously initiates an interrupt service routine in each of the threads. In a second embodiment similar to the first, the instruction fetch unit does not stall the leading thread, but rather, immediately initiates the interrupt service routine in the leading thread, and copies the difference to an interrupt counter. The interrupt counter is decremented as instructions are committed by the second thread, and when the counter reaches zero, the fetch unit initiates the interrupt service routine in the trailing thread.

In a third embodiment, counters are provided for each thread and used to track the number of instructions committed by each thread. When an interrupt is detected, an interrupt service routine is initiated in the leading thread without delay, and the counter value for the leading thread is placed in an interrupt queue. When the counter for the trailing thread matches the value in the queue, the interrupt service routine is initiated in the trailing thread.

In alternative embodiments, the counters may count numbers of fetched non-speculative instructions (or differences thereof) rather than numbers of committed instructions. The present invention further contemplates methods for implementing the above embodiments.

BRIEF DESCRIPTION OF THE DRAWINGS

For a detailed description of the preferred embodiments of the invention, reference will now be made to the accompanying drawings in which.

Figure 1:
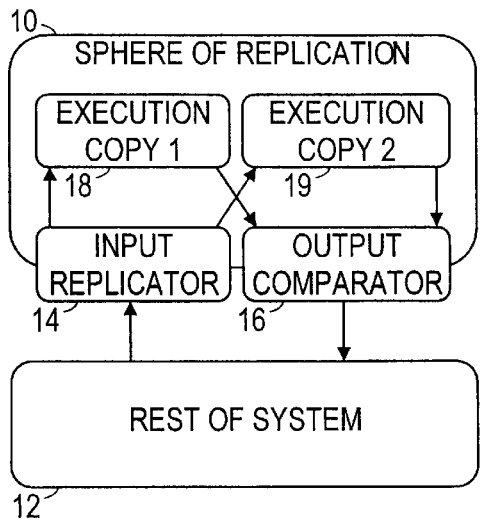
FIG. 1 is a conceptual diagram of a fault-tolerant computing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components. As one skilled in the art will appreciate, microprocessor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . ." . Also, the term "couple" or "couples" is intended to mean either an indirect or direct electrical connection. Thus, if a first device couples to a second device, that connection may be through a direct electrical connection, or through an indirect electrical connection via other devices and connections. The term "slack" is intended to mean the number of instructions that one thread is ahead of another thread that is executing the same instruction set.

DETAILED DESCRIPTION OF THE PREFERRED EMBODIMENTS

Figure 2:
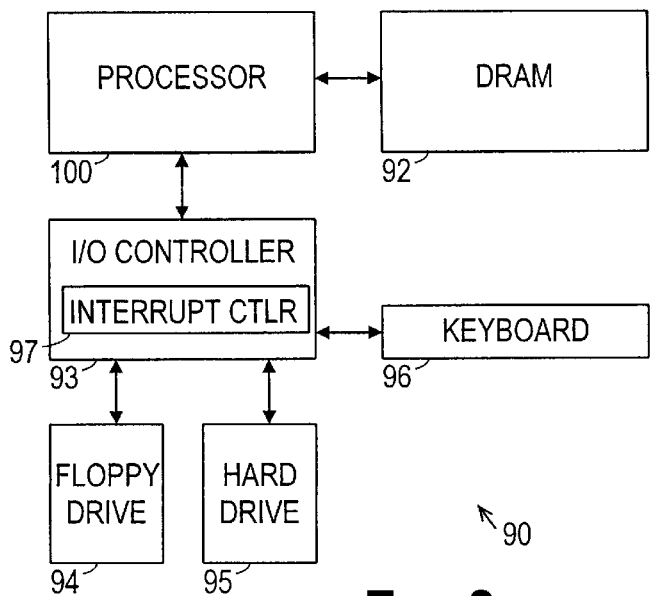
FIG. 2 is a diagram of a fault-tolerant computer including a simultaneous and redundantly threaded processor.

FIG. 2 shows a computer system 90 including a pipelined, simultaneous and redundantly threaded ("SRT") processor 100 constructed in accordance with the preferred embodiment of the invention. Besides processor 100, computer system 90 also includes dynamic random access memory ("DRAM") 92, an input/output ("I/O") controller 93, and various I/O devices which may include a floppy drive 94, a hard drive 95, a keyboard 96, and the like. The DRAM 92 can be any suitable type of memory device such as RAM-BUS™ memory. The I/O controller 93 provides an interface between processor 100 and the various I/O devices 94–96. The I/O controller 93 typically includes an interrupt controller 97 that masks, detects, prioritizes, and queues interrupt signals from various system components such as, e.g., I/O devices, memory, DMA controllers, timers, etc. In addition SRT processor 100 may also be coupled to other SRT processors, and may receive interrupt signals therefrom. The interrupt controller 97 typically asserts a processor interrupt signal when the controller determines that an unmasked interrupt is pending. Depending on the implementation, the processor interrupt signal may remain asserted until the processor has serviced all pending interrupts, or the processor interrupt signal may be momentarily re-asserted as each unmasked interrupt is detected.

Figure 4:
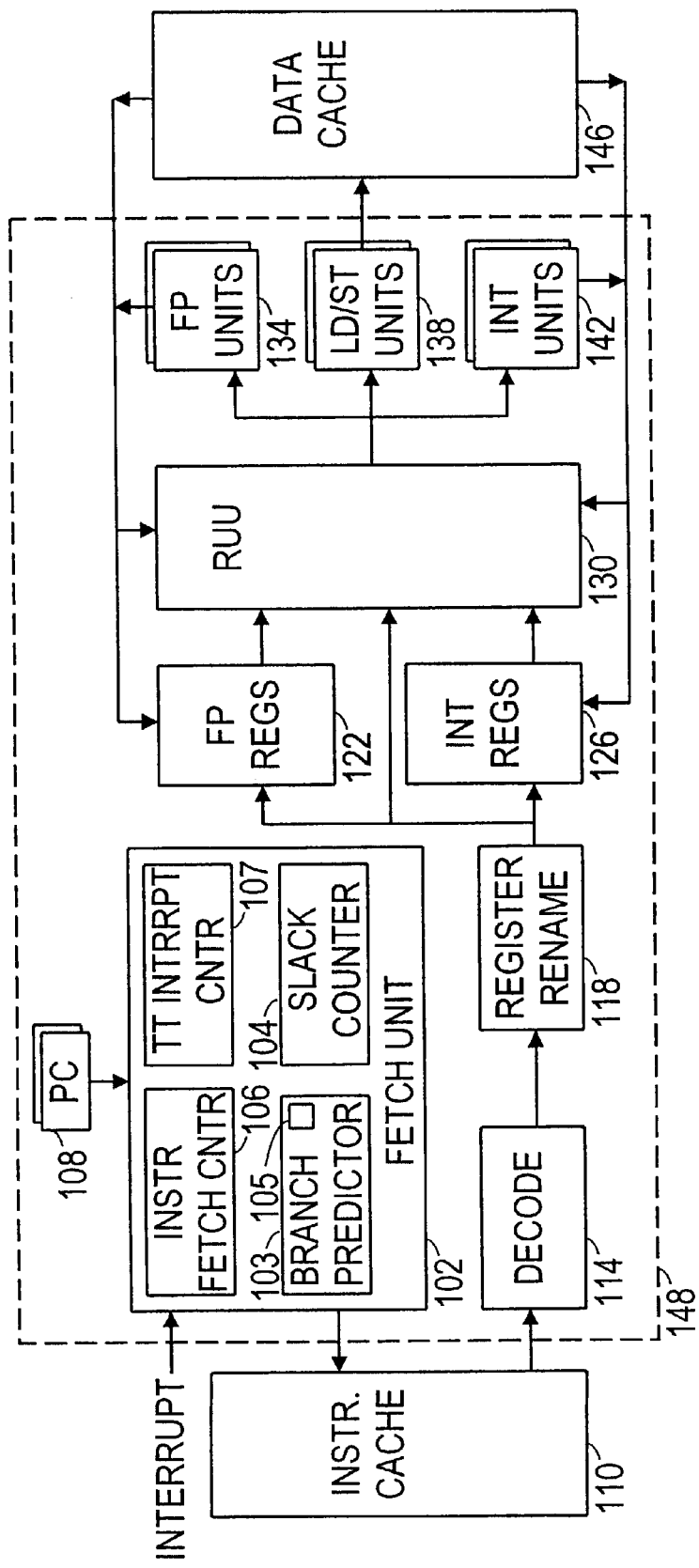
FIG. 4 is a block diagram of the simultaneous and redundantly threaded processor in accordance with a preferred embodiment.

FIG. 4 shows the SRT processor 100 of FIG. 1 in greater detail. Referring to FIG. 4, processor 100 preferably comprises a pipelined architecture which includes a series of functional units, arranged so that several units can be simultaneously processing appropriate part of several instructions. As shown, the exemplary embodiment of processor 100 includes a fetch unit 102, one or more program counters 108, an instruction cache 110, decode logic 114, register rename logic 118, floating point and integer registers 122, 126, a register update unit 130, execution units 134, 138, and 142, and a data cache 146.

Fetch unit 102 uses a program counter 108 for assistance as to which instructions to fetch. Being a multithreaded processor, the fetch unit 102 preferably can simultaneously fetch instructions from multiple threads. A separate program counter 108 may be associated with each thread. Each program counter 108 is preferably a register that contains the address of the next instruction to be fetched from the corresponding thread by the fetch unit 102. FIG. 4 shows two program counters 108 to permit the simultaneous fetching of instructions from two threads. It should be recognized, however, that additional program counters can be provided to fetch instructions from more than two threads simultaneously.

As shown, fetch unit 102 includes branch prediction logic 103, a "slack" counter 104, an instruction fetch counter 106, and a trailing thread interrupt counter 107. The counters 104, 106, 107 will be described in greater detail below. The branch prediction logic 103 permits the fetch unit 102 to speculatively retrieve instructions to be executed after a conditional branch instruction. In order to keep the pipeline full (which is desirable for efficient operation), the branch predictor logic 103 speculates the outcome of a branch instruction before the branch instruction is actually executed. Branch predictor 103 generally bases its speculation on previous executions of the branch instruction. Any suitable speculation algorithm can be used in branch predictor 103.

Referring still to FIG. 4, instruction cache 110 provides a temporary storage buffer for the instructions to be executed. Decode logic 114 retrieves the instructions from instruction cache 110 and determines the type of each instruction (e.g., add, subtract, load, store, etc.). Decoded instructions are then passed to the register rename logic 118 which maps logical registers onto a pool of physical registers.

The register update unit ("RUU") 130 provides an instruction queue for the instructions to be executed. The RUU 130 serves as a combination of global reservation station pool, rename register file, and reorder buffer. The RUU 130 breaks load and store instructions into an address portion and a memory (i.e., register) reference. The address portion is placed in the RUU 130, while the memory reference portion is placed into a load/store queue (not specifically shown in FIG. 4).

The floating point register 122 and integer register 126 are used for the execution of instructions that require the use of such registers as is known by those of ordinary skill in the art. These registers 122, 126 can be loaded with data from the data cache 146. The registers also provide their contents to the RUU 130.

As shown, the execution units 134, 138, and 142 comprise a floating point execution unit 134, a load/store execution unit 138, and an integer execution unit 142. Each execution unit performs the operation specified by the corresponding instruction type. Accordingly, the floating point execution units 134 execute floating instructions such as multiply and divide instructions while the integer execution units 142 execute integer-based instructions. The load/store units 138 perform load operations in which data from memory is loaded into a register 122 or 126. The load/store units 138 also perform load and store operations in which data is transferred between registers 122, 126 and the data cache 146 and/or DRAM memory 92 (FIG. 2).

The data cache 146 operates by storing recently accessed data in a pool of temporary, fast memory blocks. When the pool is filled, the least-recently used block is usually targeted for "replacement", i.e., the data cached in that block is replaced with more recently accessed data.

The architecture and components described above are typical of microprocessors, and particularly pipelined, multithreaded processors. Numerous modifications can be made from that shown in FIG. 4. For example, the locations of the RUU 130 and registers 122, 126 can be reversed if desired. For additional information, the following references, all of which are incorporated herein by reference, may be consulted for additional information if needed: U.S. patent application Ser. No. 08/775,553, filed Dec. 31, 1996. and "Exploiting Choice: Instruction Fetch and Issue on an Implementable Simultaneous Multithreaded Processor," by D. Tullsen, S. Eggers, J. Emer, H. Levy, J. Lo and R. Stamm, Proceedings of the 23$^{rd}$ Annual International Symposium on Computer Architecture, Philadelphia, Pa., May 1996.

The preferred embodiment of the invention provides a performance enhancement to SRT processors. The preferred SRT processor 100 described above is capable of processing instructions from two different threads simultaneously. Such a processor in fact can be made to execute the same program as two different threads. In other words, the two threads contain the same exact set of program instructions. Processing the same program through the processor in two different threads permits the processor to detect faults caused by cosmic radiation as noted above.

Figure 3:
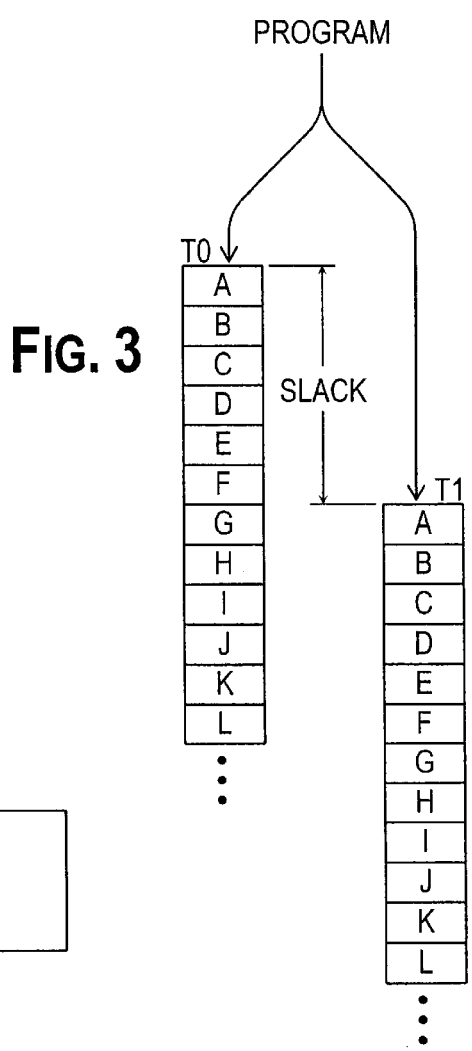
FIG. 3 is an illustrative diagram showing how execution of one thread is delayed relative to the other thread.

Referring still to FIG. 4, fetch unit 102 preferably includes a "slack" counter 104. Slack counter 104 is used to create a delay of a desired number of instructions between the two threads including the same instruction set. The delay is referred to herein as a "slack." The description of and advantage of the slack will now be explained with reference to FIG. 3 followed by a discussion of how the slack counter 104 is used to create the slack. FIG. 3 shows a single program that is copied by fetch unit 102 (FIG. 4) into two threads—thread T0 and thread T1. Both threads include instructions A–L as shown, and perhaps more. Thread T0 is arbitrarily designated as the "leading" thread while thread T1 is designated as the "trailing" thread. As shown in the conceptual drawing of FIG. 3, the instructions in trailing thread T1 make their way through the pipeline of processor 100 six instructions behind or after leading thread T0. Thus, while processor 100 processes instructions A, B, C, etc. from leading thread T0, the fetch unit 102 of processor 100 will not begin fetching instruction A from the trailing thread T1 until the processor has completed the first six instructions from the leading thread. Until the slack threshold is reached, the processor's resources are fully available to execute the instructions from leading thread T0. After the slack threshold is reached, the resources are apportioned between instructions from both threads. As explained below, the slack advantageously provides a substantial performance improvement to the multithreaded processor art.

Referring to FIGS. 3 and 4, once a branch instruction has executed in an execution unit 134, 138, 142, a register 105 in the branch predictor logic 103 is updated with the correct result of the branch. Thus, register 105 will indicate the correct direction of program execution following the branch instruction. Because of the slack between the two threads, some or all branch instructions in the leading thread preferably will be resolved before the corresponding branch instructions from the trailing thread T1 are fetched. When fetching a branch instruction from the trailing thread, the fetch unit preferably probes the register 105 in the branch predictor logic 103 to determine if that particular branch instruction from the leading thread has already been fetched and resolved. If so, branch speculation is carried out with 100% accuracy (in the absence of a fault) in the trailing thread, because the leading thread has already determined the next instruction to execute after the branch instruction. As such, speculation of trailing thread branch instructions is conducted, but misspeculation is generally nonexistent. Accordingly, the latency caused by branch misspeculation is avoided in the trailing thread.

Similarly, cache misses can be avoided in the trailing thread. Some or all cache misses in the leading thread will result in the requested data being written to the processor's data cache 146. When that same instruction is processed in the trailing thread, the requested data will already be present in data cache 146 thereby a cache miss in the trailing thread and eliminating the latency such a cache miss would have caused.

In short, the introduction of slack permits the leading thread to resolve all or most branch misspeculations and cache misses so that the corresponding instructions in the trailing thread will not experience the same latency problems. Thus, the introduction of slack into the simultaneous multithreaded operation achieves at least two performance benefits—reducing the frequency of cache misses and branch misspeculations in the trailing thread.

The use of the slack counter 104 to create the instruction slack between the leading and trailing threads will now be described. The slack counter 104 preferably is a signed counter that is decremented when the leading thread T0 commits an instruction ("committing" an instruction refers to the process of completing the execution of and retiring an instruction). Further, the counter is incremented when the trailing thread commits an instruction. The counter 104 preferably is initialized at system reset to the target slack. As the leading thread incurs various latencies that the trailing thread does not encounter, the initial slack between the threads will decrease (the slack count will get larger). The fetch unit 102 monitors the slack, and when the slack count exceeds a selected threshold, the fetch unit 102 preferentially retrieves instructions for the leading thread until the slack is re-established. This process automatically guides the fetch unit 102 to maintain the desired instruction slack.

The amount of slack in the example of FIG. 3 is six instructions. In general, the amount of slack can be any desired number of instructions. For example, as shown in Provisional patent application Serial No. 60/198,530, filed on Apr. 19, 2000, a slack of 256 instructions was shown to provide a 10% performance increase. The amount of slack can be preset or programmable by the user of computer system 90 and preferably is large enough to permit the leading thread to resolve some, most, or all cache misses and branch misspeculations before the corresponding instructions from the trailing thread are executed. It will also be understood by one of ordinary skill in the art that, in certain situations, the two threads will have to be synchronized thereby reducing the slack to zero. Examples of such situations include uncached loads and external interrupts.

In FIG. 4, the "sphere of replication" 148 is shown in broken outline. It preferably includes at least the instruction execution circuitry, namely, the instruction decode logic 114 and the execution units 134, 138, and 142. The registers 122, 126, and associated register management hardware 118, 130, are preferably also included. This is not the only sphere of replication which could be chosen, but it represents a convenient and preferred choice. The inputs to sphere 148 may include Instructions, Load Data, and External Interrupts. The outputs from sphere 148 may include Instruction Addresses, Load Addresses, and Store Addresses & Data. In this application, the focus on replication of External Interrupts. Replication of other inputs and comparison of other outputs are dealt with in related applications.

In a conventional processor, assertion of an External Interrupt (such as the processor interrupt signal provided by interrupt controller 97) causes the processor to halt execution of the current instruction thread, temporarily store certain processor state values, and begin execution of an interrupt service routine. The interrupt service routine is a program much like any other, but designed to determine the source of the interrupt, take whatever action is necessary to resolve the interrupt, and return control of the processor to the original instruction thread. The consequence of an interrupt is that an interrupt service routine is executed between two instructions of the original instruction thread. The two instructions that bracket the interrupt service routine are determined solely by the time at which the interrupt is received.

In processor 100, the interrupt service routine must be executed by both threads to provide redundancy. Input replication of External Interrupts is problematic because of the slack between the threads. For example, consider a program waiting in a spin loop on an interrupt to be asserted by another processor. The program may count the number of loop iterations in order to profile waiting times or adaptively switch synchronization algorithms. To prevent redundant threads from diverging, both threads must spin for an identical number of iterations. That is, the interrupt must appear to occur in the same loop iteration in each thread, even if these corresponding iterations are widely separated in time. Further the interrupt service routines should be bracketed by the same two instructions in each thread. It is noted that using the program counter 108 to identify interrupt points is unsatisfactory because in a loop, the program counter does not indicate which iteration of the loop experienced the interrupt in the leading thread.

In one embodiment, the fetch unit 102, upon receiving the interrupt assertion, stalls the leading thread until the slack counter 104 indicates that the threads are synchronized (i.e., when the slack counter reaches the predetermined slack value). Once the leading and trailing threads are synchronized, the fetch unit 102 simultaneously initiates an interrupt of both threads. This preferably includes storing a copy of the program counter values and fetching a jump instruction (for each thread) to the instruction service routine.

In a second embodiment, the fetch unit 102 includes an instruction fetch counter 106, and a trailing thread interrupt counter 107. Unlike the slack counter 104, the instruction fetch counter 106 indicates the difference in number of instructions fetched by the threads (rather than the difference in number of instructions committed by the threads), and counter 106 is set to zero when the threads are in synchronization (rather than the predetermined slack target). When the fetch unit fetches instructions for the designated leading thread, the instruction fetch counter is incremented, and when the fetch unit fetches instructions for the designated trailing thread, the instruction fetch counter is decremented. The counter is preferably signed, so that the count remains correct even if the designated trailing thread ends up getting ahead of the designated leading thread. Of course, any instructions that are squashed in one thread and not the other (perhaps due to branch misspeculation) must be accounted for. This may be achieved by not incrementing the counter when the fetch unit retrieves speculative instructions until the status of these instructions is resolved.

When the fetch unit 102 receives an interrupt assertion, the fetch unit copies the value of the instruction fetch counter 106 to the trailing thread interrupt counter 107, and determines which thread is trailing based on the sign of the instruction fetch counter. The fetch unit 102 initiates an interrupt for the leading thread, perhaps by inserting a call to the interrupt service routine in the instruction stream for the leading thread. As the threads continue to execute, the trailing thread interrupt counter 107 counts towards zero (decrementing if positive, incrementing if negative) for each instruction fetched for the trailing thread by the fetch unit 102. Once the trailing thread interrupt counter 107 reaches zero, the fetch unit then initiates an interrupt for the trailing thread. This ensures that the trailing thread is interrupted at the same point as the leading thread.

Where it is desirable to provide for the possibility of multiple interrupts, the fetch unit 102 may include an instruction counter for each thread. The instruction counter may be incremented for each instruction committed by the corresponding thread. Upon receiving an interrupt, the fetch unit 102 compares the instruction counters to determine which thread is the leading thread, copies the instruction counter value for the leading thread to an interrupt queue, and initiates an interrupt of the leading thread. Thereafter, the contents of the queue are compared to the instruction counters, and when a match is detected, an interrupt is initiated for the corresponding thread, and the queue entry removed from the queue. Note that the counters and queue should be provided protection against errors, e.g., by duplication of hardware or by parity check/ECC techniques.

It is noted that counting fetched instructions and counting committed instructions are closely related functions, and in variations of the above described interrupt replication embodiments, counters of fetched instructions may be used in place of counters of committed instructions (and vice versa), assuming appropriate adjustments are made. Further, different counters (e.g., slack counter 104 and the instruction fetch counter 106) may be combined while maintaining the functionality of each. For example, the instruction fetch counter may be replaced with a instruction commit counter that tracks the difference between threads, and an offset from the counter value may be maintained to monitor the slack value.

It is further noted that the sphere of replication may be designed to place the registers outside the sphere of replication. In this case, the threads may be synchronized by rolling both threads back to the point of the last committed register write.

Accordingly, the preferred embodiment of the invention provides a significant performance increase of an SRT processor that can execute the same instruction set in two different threads and ensure External Interrupt replication. The above discussion is meant to be illustrative of the principles and various embodiments of the present invention. Numerous variations and modifications will become apparent to those skilled in the art once the above disclosure is fully appreciated. For example, the principles disclosed herein may be extended to accommodate more than 2 redundant threads being executed by the processor. It is intended that the following claims be interpreted to embrace all such variations and modifications.

What is claimed is:

1. A processor, comprising:
   instruction execution circuitry that executes instructions in a leading thread and a redundant, trailing thread;
   a counter that tracks a difference between the leading and trailing thread in number of instructions committed by the instruction execution circuitry; and
   instruction fetch circuitry coupled to the instruction execution circuitry to provide the instructions in the redundant threads, wherein when the processor receives an external interrupt signal, the instruction fetch circuitry stalls the leading thread until the counter indicates that the threads are synchronized before initiating an interrupt service routine in each of the threads.

2. The processor of claim 1, further comprising:

an instruction decoder coupled to the instruction execution circuitry, and configured to convert instructions into hardware signals that control the operation of the instruction execution circuitry; and an instruction cache coupled to the instruction fetch circuitry and coupled to the instruction decoder, wherein the instruction cache is configured to provide instructions to the instruction decoder in accordance with instruction addresses received from the instruction fetch circuitry.

3. The processor of claim 1, wherein the instruction fetch circuitry is configured to introduce an amount of slack between execution of corresponding instructions in the leading and trailing threads, wherein said amount of slack is substantially equal to a predetermined slack value unless the instruction fetch circuitry determines that thread synchronization is necessary.

4. The processor of claim 1, wherein the counter is a signed counter that is initialized to zero when the threads are started.

5. The processor of claim 1, wherein the counter is incremented when instructions are committed by one of the threads, and wherein the counter is decremented when instructions are committed by the other one of the threads.

6. A method of replicating interrupts to redundant threads, comprising:

executing instructions in a leading thread and a trailing thread;

tracking a difference between the leading and trailing thread in number of instructions committed; and interrupting the threads when an external interrupt is received, wherein said interrupting includes:
stalling the leading thread until the counter indicates that the threads are synchronized; and
initiating an interrupt service in each of the threads.

7. The method of claim 6, further comprising:

determining whether synchronization is necessary, and if not, preferentially fetching instructions for the leading thread until a predetermined slack is achieved between the leading and trailing threads.

8. The method of claim 6, wherein said tracking includes:

incrementing a signed counter when an instruction in the leading thread is committed; and decrementing the counter when an instruction in the trailing thread is committed.

9. The method of claim 6, wherein said initiating includes inserting in each of the threads a call instruction to the interrupt service routine.

10. A processor, comprising:

instruction execution circuitry that executes instructions in a leading thread and a redundant, trailing thread;

an instruction counter that tracks a difference between the leading and trailing thread in number of instructions committed by the instruction execution circuitry;

an interrupt counter that, when initiated, decrements from an initial value to zero; and instruction fetch circuitry coupled to the instruction execution circuitry to provide the instructions in the threads, wherein when the processor receives an external interrupt signal, the instruction fetch circuitry initiates the interrupt counter with the instruction counter value, immediately initiates an interrupt service routine in the leading thread, and initiates an interrupt service routine in the trailing thread when the interrupt counter reaches zero.

11. The processor of claim 10, further comprising:

an instruction decoder coupled to the instruction execution circuitry, and configured to convert instructions into hardware signals that control the operation of the instruction execution circuitry; and an instruction cache coupled to the instruction fetch circuitry and coupled to the instruction decoder, wherein the instruction cache is configured to provide instructions to the instruction decoder in accordance with instruction addresses received from the instruction fetch circuitry.

12. The processor of claim 10, wherein the instruction fetch circuitry is configured to introduce an amount of slack between execution of corresponding instructions in the leading and trailing threads, wherein said amount of slack is substantially equal to a predetermined slack value unless the instruction fetch circuitry determines that thread synchronization is necessary.

13. The processor of claim 10, wherein the instruction counter is a signed counter that is initialized to zero when the threads are started.

14. The processor of claim 10, wherein the instruction counter is incremented when instructions are committed by one of the threads, and wherein the instruction counter is decremented when instructions are committed by the other one of the threads.

15. A method of replicating interrupts to redundant threads, comprising:

executing instructions in a leading thread and a trailing thread;

tracking a difference between the leading and trailing thread in number of instructions committed; and interrupting the threads when an external interrupt is received, wherein said interrupting includes:
copying the difference to a counter;
initiating an interrupt service routine in the leading thread without delay;
decrementing the counter each time an instruction is committed in the trailing thread; and
initiating an interrupt service routine in the trailing thread when the counter reaches zero.

16. The method of claim 15, further comprising:

determining whether synchronization is necessary, and if not, preferentially fetching instructions for the leading thread until a predetermined slack is achieved between the leading and trailing threads.

17. The method of claim 15, wherein said tracking includes:

incrementing a signed counter when an instruction in the leading thread is committed; and decrementing the signed counter when an instruction in the trailing thread is committed.

18. The method of claim 15, wherein said acts of initiating an interrupt service routine include inserting in a thread a call instruction to the interrupt service routine.

19. A processor, comprising:

instruction execution circuitry that executes instructions in a first thread and a redundant, second thread;

a first instruction counter that counts instructions in the first thread committed by the instruction execution circuitry;

a second instruction counter that counts instructions in the second thread committed by the instruction execution circuitry;

a interrupt queue; and instruction fetch circuitry coupled to the instruction execution circuitry to provide the instructions in the threads, wherein when the processor receives an external interrupt signal, the instruction fetch circuitry determines which of the first and second threads is a leading thread, copies a value from a corresponding instruction counter to the interrupt queue, and initiates without delay an interrupt service routine in the leading thread, and initiates an interrupt service routine in the non-leading thread when the other instruction counter matches the value in the interrupt queue.

20. The processor of claim 19, further comprising:

an instruction decoder coupled to the instruction execution circuitry, and configured to convert instructions into hardware signals that control the operation of the instruction execution circuitry; and an instruction cache coupled to the instruction fetch circuitry and coupled to the instruction decoder, wherein the instruction cache is configured to provide instructions to the instruction decoder in accordance with instruction addresses received from the instruction fetch circuitry.

21. The processor of claim 19, wherein the instruction fetch circuitry is configured to introduce an amount of slack between execution of corresponding instructions in the first and second threads, wherein said amount of slack is substantially equal to a predetermined slack value unless the instruction fetch circuitry determines that thread synchronization is necessary.

22. The processor of claim 19, wherein the instruction counters are initialized to a common value when the threads are started.

23. A method of replicating interrupts to redundant threads, comprising:

executing instructions in a first thread and a second thread;

counting a first number of instructions committed by a first thread;

counting a second number of instructions committed by a second thread; and interrupting the threads when an external interrupt is received, wherein said interrupting includes:
determining which of the first and second threads is a leading thread;
copying a number of instructions committed by the leading thread to a queue;
initiating an interrupt service routine in the leading thread without delay; and
initiating an interrupt service routine in the non-leading thread when the number of instructions committed by the non-leading thread matches the number in the queue.

24. The method of claim 23, wherein said interrupting further includes:
dequeuing the number in the queue when initiating the interrupt service routine in the non-leading thread.

25. The method of claim 23, wherein said determining includes:
comparing the first number with the second number, and designating whichever thread that corresponds to the higher number as the leading thread.

26. The method of claim 23, further comprising:
determining whether synchronization is necessary, and if not, preferentially fetching instructions for the first thread until a predetermined slack is achieved between the first and second threads.

27. The method of claim 23, wherein said acts of initiating an interrupt service routine include inserting in a thread a call instruction to the interrupt service routine.

28. A processor, comprising:

instruction execution circuitry that executes instructions in a leading thread and a redundant, trailing thread;

a counter that tracks a difference between leading and trailing thread in number of non-speculative instructions provided to the instruction execution circuitry; and instruction fetch circuitry coupled to the instruction execution circuitry to provide the instructions in the redundant threads, wherein when the processor receives an external interrupt signal, the instruction fetch circuitry stalls the leading thread until the counter indicates that the threads are synchronized before initiating an interrupt service routine in each of the threads.

29. A computer, comprising:

a simultaneously and redundantly threaded ("SRT") processor;

an main system memory coupled to said processor;

an I/O controller coupled to said processor, wherein the I/O controller includes an interrupt controller that provides a processor interrupt to the processor;

an I/O device coupled to said I/O controller, and configured to assert a device interrupt signal to the interrupt controller, wherein the interrupt controller asserts the processor interrupt signal if the device interrupt signal is unmasked, wherein the processor includes:
instruction execution circuitry that executes instructions in a leading thread and a redundant, trailing thread;
a counter that tracks a difference between the leading and trailing thread in number of instructions committed by the instruction execution circuitry; and
instruction fetch circuitry coupled to the instruction execution circuitry to provide the instructions in the redundant threads, wherein when the processor detects an assertion of the processor interrupt signal, the instruction fetch circuitry stalls the leading thread until the counter indicates that the threads are synchronized before initiating an interrupt service routine in each of the threads.

* * * * *